United States Patent [19]

Fujioka

[11] Patent Number: 5,637,140
[45] Date of Patent: Jun. 10, 1997

[54] WATER-BASED INK COMPOSITION AND INK-JET RECORDING PROCESS

[75] Inventor: Masaya Fujioka, Nagoya, Japan

[73] Assignee: Brother Kogyo Kabushiki Kaisha, Nagoya, Japan

[21] Appl. No.: 663,979

[22] Filed: Jun. 14, 1996

[30] Foreign Application Priority Data

Jun. 21, 1995 [JP] Japan ................................. 7-154442
Jun. 23, 1995 [JP] Japan ................................. 7-157422

[51] Int. Cl.$^6$ ..................................... C09D 11/02
[52] U.S. Cl. ..................... 106/31.35; 106/31.67; 347/100
[58] Field of Search ................ 106/27 R, 22 E, 106/20 A, 22 B, 20 D

[56] References Cited

U.S. PATENT DOCUMENTS

| | | | |
|---|---|---|---|
| 4,683,002 | 7/1987 | Mirua et al. | 106/22 B |
| 4,849,773 | 7/1989 | Owatari | 106/22 E |

FOREIGN PATENT DOCUMENTS

| | | |
|---|---|---|
| 64-4350 | 1/1989 | Japan . |
| B2-2-2906 | 1/1990 | Japan . |
| B2-3-48951 | 7/1991 | Japan . |
| B2-5-62634 | 9/1993 | Japan . |
| B2-60-48552 | 10/1995 | Japan . |

*Primary Examiner*—Helene Klemanski
*Attorney, Agent, or Firm*—Oliff & Berridge

[57] ABSTRACT

A water-based ink composition comprising a dye or pigment, dissolved or dispersed in an aqueous medium, and having at least one of fatty acids in a total content not more than 0.3% by weight and fatty acid esters in a total content not more than 0.6% by weight.

31 Claims, No Drawings

WATER-BASED INK COMPOSITION AND INK-JET RECORDING PROCESS

BACKGROUND OF THE INVENTION

1. Field of the Invention

This invention relates to a water-based ink composition, and an ink-jet recording process.

2. Description of the Related Art

As ink-jet recording systems, ink ejection systems are known in the art as exemplified by a system utilizing electrostatic attraction, a system in which mechanical vibration or displacement is imparted to an ink composition by the use of a piezoelectric device, and a system in which an ink composition is heated to cause it bubble and a pressure produced when it bubbles is utilized. Ink droplets are formed by some of these ink ejection systems, and part or the whole of the droplets is caused to adhere to recording mediums such as paper to make a record. When writing implements such as fountain pens, felt-tip pens and ball-point pens are used, an ink composition is ejected from capillaries and the ink composition thus ejected is received on recording mediums to make a record. As ink compositions used in such ink-jet recording systems or writing implements, those prepared by dissolving or dispersing a water-soluble dye or a pigment in water or an aqueous medium comprising water and a water-soluble organic solvent are known and put into use.

In such conventional ink compositions, they are of course required to have various performances. In particular, the performance most required is the liquid stability that the ink composition does not cause clogging of, and deposits at, nozzles or orifices of recording apparatus or pen points when recording is being performed using the ink composition, when the recording is paused and also when the recording is stopped over a long period of time. Especially in the ink-jet recording systems, the apparatus are expensive compared with the writing implements, and hence it is important to prevent ink-jet nozzles or orifices from clogging. Moreover, in the ink-jet recording systems, if the nozzles or orifices are not even clogged, faulty images due to curved jets, changes in ink drop quantity and changes in flying speed which are caused by the deposits formed at the nozzles or orifices have caused a great problem. Furthermore, among the ink-jet recording systems, the thermal ink-jet recording system that utilizes heat energy tends to cause deposition of foreign matter on the surface of a heating element as a result of temperature changes, and the problem is more important.

Commercially available dyes or pigments used as materials for ink compositions also contain many impurities (e.g., organic matter and inorganic matter such as dispersants and leveling agents). Ink components other than the dyes or pigments, as exemplified by water and water-soluble organic solvents, also contain not a little organic or inorganic impurities. Still also, during the manufacture of ink compositions, various impurities may be included therein according to containers or implements used and the environment.

Under such circumstances, it has been attempted to solve the above problems by controlling the quantity of the impurities in ink compositions that may cause the deposits.

For example, Japanese Patent Application Laid-open No. 3-48951 discloses a liquid composition containing a water-soluble dye used in ink-jet recording and in which iron and silicon contained therein are controlled to be in a content not more than 9 ppm in total. Japanese Patent Publication No. 2-2906 also discloses an ink-jet recording ink composition mainly composed of an aqueous solution containing a water-soluble acid dye or water-soluble direct dye having been subjected to ion exchange by the use of a cationic ion-exchange resin.

Japanese Patent Application Laid-open No. 64-4350 also discloses an ink-jet recording apparatus in which sodium ions in an ink composition are controlled to be in a content of 0.001% by weight to 0.2% by weight, and fatty acids and fatty acid derivatives contained in materials constituting an ink tank, 10 to 100 ppm in total weight.

Japanese Patent Publication No. 60-48552 still also discloses an ink composition comprising water, a water-soluble dye and a polyhydric alcohol or polyhydric alcohol derivative and in which a fatty acid ester as an anti-foaming agent is controlled to be in a content of 0.01% by weight to 5% by weight.

Such conventional impurity-controlled ink compositions are more improved than ink compositions containing impurities in excess. However, they have not necessarily been well effective when, for example, even the long-term storage of ink compositions and the changes in temperature and environment are taken into account. In particular, they have not perfectly solved the problems of the curved jets, changes in ink drop quantity and changes in flying speed in the ink-jet recording systems. In the case of the ink-jet recording system utilizing heat energy, they have been not able to well prevent the deposition of foreign matter on the heating element.

The above Japanese Patent Application Laid-open No. 64-4350 does not teach any control of the quantity of fatty acids or fatty acid esters in ink compositions.

The above Japanese Patent Publication No. 60-48552 teaches control of the quantity of a fatty acid ester intentionally added as an anti-foaming agent, but does not teach any control of the quantity of fatty acid esters as well as impurities that are actually present in ink compositions.

SUMMARY OF THE INVENTION

The present invention was made in order to solve the problems discussed above. Accordingly, an object of the present invention is to provide a water-based ink composition that may cause no clogging of nozzles or orifices in the heads of ink-jet printers or the like, and may cause no faulty prints due to curved jets, changes in ink drop quantity and changes in flying speed, when used, when stored for a long term and even when undergoes changes in temperature and environment.

To achieve the above object, the present inventors made extensive studies. Since the impurities contained in inks cause the above problems, they studied various effects or influences of such impurities. As the result, they have discovered that the clogging of nozzles or orifices in the ink-jet heads, the formation of deposits on the heating elements, the curved jets, the changes in ink drop quantity, the changes in flying speed and the deposits formed during the storage of inks are greatly caused by fatty acids or fatty acid esters contained in ink compositions, and that the above various problems can be solved when an ink composition is used whose quantity of such impurities has been controlled to be not more than a certain value is used. Thus, they have accomplished the present invention.

The present invention provides a water-based ink composition comprising a dye or a pigment, dissolved or dispersed in an aqueous medium, wherein the water-based ink composition has fatty acids in a total content not more than 0.3% by weight or fatty acid esters in a total content not more than 0.6% by weight.

The present invention also provides an ink-jet recording process carried out by jetting a water-based ink composition to a recording medium in the form of droplets to make a record, wherein the water-based ink composition comprises a dye or a pigment, dissolved or dispersed in an aqueous medium, and has fatty acids in a total content not more than 0.3% by weight or fatty acid esters in a total content not more than 0.6% by weight.

In the present invention, the water-based ink composition may fulfill either the condition that the fatty acids are in a total content not more than 0.3% by weight or the condition that the fatty acid esters are in a total content not more than 0.6% by weight. It is preferable for the water-based ink composition to fulfill both the conditions at the same time.

These and other features and advantages of the present invention are described in or will become apparent from the following detailed description of the preferred embodiments.

DESCRIPTION OF THE PREFERRED EMBODIMENTS

The water-based ink composition of the present invention is characterized in that the total content of fatty acids is controlled to be not more than 0.3% by weight or the total content of fatty acid esters is controlled to be not more than 0.6% by weight. This makes it possible to prevent clogging of nozzles or orifices in the heads of ink-jet printers or the like, and prevent curved jets, so that faulty prints due to changes in ink drop quantity and changes in flying speed can be prevented, when the ink composition is used, when stored for a long term and when undergoes changes in temperature and environment.

The reason why the content of the fatty acids or fatty acid esters is set not more than the stated value in this way is as follows:

According to the studies made by the present inventors, as a result of analyses of the deposits formed during a long-term storage of water-based ink compositions and the deposits formed at nozzles or orifices of ink-jet heads having caused curved jets or non-ejection and also as result of analyses of the deposits formed on the surfaces of heating elements, it has been found that these phenomena are chiefly caused by fatty acids or fatty acid esters and also that the frequencies of the curved jets, changes in ink drop quantity and changes in flying speed that may occur in ink-jet recording systems distinctively correlate with the content of the fatty acids or fatty acid esters in water-based ink compositions.

The mechanism by which the fatty acids or fatty acid esters cause the problems as stated above is unclear, and is presumed as follows:

The fatty acids or fatty acid esters present in ink compositions are in the state they are completely dissolved or dispersed in the water-based ink composition available immediately after it has been prepared through the step of precision filtration. Thereafter the water-based ink composition undergoes environmental changes such as changes in temperature, humidity, pH and so forth, whereupon the fatty acids or fatty acid esters react with cations as typified by alkali metal ions present in the water-based ink composition, to form insoluble salts. The insoluble salts cause the clogging of nozzles or orifices of the ink-jet heads and the formation of deposits on the heating elements. In particular, the salts of the fatty acids or fatty acid esters with the cations are remarkably produced at low temperatures, and are remarkably produced also when ink compositions have a high pH.

In the water-based ink composition of the present invention, the fatty acid are controlled to be in a total content not more than 0.3% by weight as previously stated, and preferably not more than 0.09% by weight. The fatty acid esters are controlled to be in a total content not more than 0.6% by weight, and preferably not more than 0.3% by weight. It is also preferable for the water-based ink composition to fulfill at the same time both the condition that the fatty acids are in a total content not more than 0.3% by weight, and preferably not more than 0.09% by weight, and the condition that the fatty acid esters are in a total content not more than 0.6% by weight, and preferably not more than 0.3% by weight.

Here, the fatty acids, which are contained in dust or dirt present in the atmosphere or contained in dyes, surface active agents and so forth as impurities, include fatty acids ranging from lower fatty acids up to higher fatty acids having 22 or more carbon atoms. As fatty acids that are present in relatively a large quantity and also form the insoluble salts, it is preferable to take note of palmitic acid and stearic acid. In such an instance, the palmitic acid in the water-based ink composition may preferably be controlled to be in a content not more than 0.1% by weight, and more preferably 0.03% by weight. The stearic acid may preferably be controlled to be in a content not more than 0.2% by weight, and more preferably not more than 0.06% by weight.

The fatty acid esters, which are contained in dust or dirt present in the atmosphere or contained in dyes, surface active agents and so forth as impurities, include lower alkyl esters or glycerides of fatty acids ranging from lower fatty acids up to higher fatty acids having 22 or more carbon atoms. As fatty acid esters that are present in relatively a large quantity and also form the insoluble salts, it is preferable to take note of methyl palmitate and methyl stearate. In such an instance, the methyl palmitate in the water-based ink composition may preferably be controlled to be in a content not more than 0.2% by weight, and more preferably 0.1% by weight. The methyl stearate may preferably be controlled to be in a content not more than 0.4% by weight, and more preferably not more than 0.2% by weight.

Basic components that make up the water-based ink composition of the present invention will be described below.

As basic components that make up the water-based ink composition of the present invention, those conventionally used in water-based ink compositions may be used.

For example, the dye includes water-soluble dyes as typified by direct dyes, acid dyes, basic dyes and reactive dyes. In particular, as those preferable for inks used in the ink-jet recording systems and satisfying sharpness, water-solubility, stability, light-fastness and other required performances, the dye includes, for example, C.I. Direct Black 17, 19, 32, 51, 71, 108, 146, 154, 168; C.I. Direct Blue 6, 22, 25, 71, 86, 90, 106, 199; C.I. Direct Red 1, 4, 17, 28, 83, 227; C.I. Direct Yellow 12, 24, 26, 86, 98, 142; C.I. Direct Orange 34, 39, 44, 46, 60; C.I. Direct Violet 47, 48; C.I. Direct Brown 109; C.I. Direct Green 59; C.I. Acid Black 2, 7, 24, 26, 31, 52, 63, 112, 118; C.I. Acid Blue 9, 22, 40, 59, 93, 102, 104, 113, 117, 120, 167, 229, 234; C.I. Acid Red 1, 6, 32, 37, 51, 52, 80, 85, 87, 92, 94, 115, 181, 256, 289, 315, 317; C.I. Acid Yellow 11, 17, 23, 25, 29, 42, 61, 71; C.I. Acid Orange 7, 19; C.I. Acid Violet 49; C.I. Basic Black 2; C.I. Basic Blue 1, 3, 5, 7, 9, 24, 25, 26, 28, 29; C.I. Basic Red 1, 2, 9, 12, 13, 14, 37; C.I. Basic Violet 7, 14, 27; and C.I. Food Black 1, 2.

The foregoing examples of the dye are examples particularly preferred for the water-based ink composition of the present invention. In the present invention, examples are by no means limited to these dyes.

As the pigment, carbon black and besides many inorganic pigments and organic pigments may be used. For example, it may include azo pigments such as azo lakes, insoluble azo pigments, condensed azo pigments and chelate azo pigments, polycyclic pigments such as phthalocyanine pigments, perylene and perynone pigments, anthraquinone pigments, quinacridone pigments, dioxazine pigments, thioindigo pigments, isoindolinone pigments and quinophthalone, dye lakes such as basic dye lakes and acid dye lakes, organic pigments such as nitro pigments, nitroso pigments and aniline black daylight fluorescent pigments, and inorganic pigments such as titanium oxide, iron oxide type ones and carbon black type ones. Other pigments may also be used so long as they are dispersible in an aqueous phase. Those obtained by surface-treating these pigments with a surface active agent or a polymeric dispersant, as exemplified by graft carbon, may also be used.

The foregoing examples of the pigment are examples particularly preferred for the water-based ink composition of the present invention. In the present invention, examples are by no means limited to these dyes.

When the above pigment is used as a colorant of the present invention, it is dispersed by a conventionally known method together with a suitable dispersant, a solvent, pure water and optionally other additives.

As the dispersant, polymeric dispersants or surface active agents as disclosed in, for example, Japanese Patent Application Laid-open No. 62-101672 may be used. The polymeric dispersants include anionic polymeric dispersants as exemplified by proteins such as gelatin and albumin, natural rubbers such as gum arabic and tragacanth rubber, glucosides such as saponin, cellulose derivatives such as methyl cellulose, carboxyl cellulose and hydroxymethyl cellulose, natural polymers such as lignin sulfonate and shellac, polyaclyrates, salts of a styrene-acrylic acid copolymer, salts of a vinylnaphthalene-acrylic acid copolymer, salts of a styrene-maleic acid copolymer, salts of a vinylnaphthalene-maleic acid copolymer, sodium salt of a formalin condensate with β-naphthalenesulfonic acid, and phosphates; and nonionic polymeric dispersants such as polyvinyl alcohol, polyvinyl pyrrolidone and polyethylene glycol. The surface active agents include anionic surface active agents such as higher alcohol sulfuric acid ester salts, liquid fatty oil sulfuric acid ester salts and alkylalllylsulfonic acid salts, and nonionic surface active agents such as polyoxyethylene alkyl ethers, polyoxyethylene alkyl esters, sorbitan alkyl esters and polyoxyethylene sorbitan alkyl esters. One or more kinds of these may be used under appropriate selection. The dispersant may preferably be used in an amount of usually from 1 to 20% by weight based on the total weight of the ink composition.

Meanwhile, the dispersion machine used to disperse the pigment may include any of those commonly available as dispersion machines, as exemplified by ball mills, roll mills and sand mills. In particular, high-speed sand mills are especially preferred.

The dye and the pigment may each be used alone, or may be used as a mixture of two or more kinds of dyes, pigments, or dyes and pigments in combination.

The dye and the pigment may be used in an amount of usually from 0.1 to 20% by weight, and preferably from 0.3 to 15% by weight, based on the weight of the water-based ink composition of the present invention.

The aqueous medium used in the water-based ink composition of the present invention and used in the recording process of the present invention may be water, or a mixed solvent of water and a water-soluble organic solvent. Particularly preferably, it may be a mixed solvent of water and a water-soluble organic solvent. The water-soluble organic solvent includes those having a drying-preventive (wetting) effect. As the water, it is preferable to use not commonly available water containing various ions but deionized water.

The water-soluble organic solvent used as its mixture with water may include, for example, alkyl alcohols having 1 to 4 carbon atoms, such as methyl alcohol, ethyl alcohol, n-propyl alcohol, isopropyl alcohol, n-butyl alcohol, sec-butyl alcohol, tert-butyl alcohol and isobutyl alcohol; amides such as dimethylformamide and dimethylacetamide; ketones or ketoalcohols such as acetone and diacetone alcohol; ethers such as tetrahydrofuran and dioxane; polyalkylene glycols such as polyethylene glycol and polypropylene glycol; alkylene glycols whose alkylene group has 2 to 6 carbon atoms, such as ethylene glycol, propylene glycol, butylene glycol, diethylene glycol, dipropylene glycol, triethylene glycol, tripropylene glycol, 1,2,6-hexanetriol, thiodiglycol, 1,3-butanediol, 1,5-pentanediol and hexylene glycol; glycerol; lower alkyl ethers of polyhydric alcohols, such as ethylene glycol methyl (or ethyl or n-propyl or isopropyl or n-butyl or isobutyl) ether, propylene glycol methyl (or ethyl or n-propyl or isopropyl or n-butyl or isobutyl) ether, diethylene glycol methyl (or ethyl or n-propyl or isopropyl or n-butyl or isobutyl) ether, dipropylene glycol methyl (or ethyl or n-propyl or isopropyl or n-butyl or isobutyl) ether, triethylene glycol methyl (or ethyl or n-propyl or isopropyl or n-butyl or isobutyl) ether, and tripropylene glycol methyl (or ethyl or n-propyl or isopropyl or n-butyl or isobutyl) ether; pyrrolidones such as 2-pyrrolidone and N-methyl-2-pyrrolidone; and 1,3-dimethyl-2-imidazolidinone. Of these many water-soluble organic solvents, polyhydric alcohols such as diethylene glycol and glycerol, and lower alkyl ethers of polyhydric alcohols, such as triethylene glycol monomethyl (or ethyl or n-propyl or isopropyl or n-butyl or isobutyl) ether are preferred.

The water-soluble organic solvent may be contained in the ink composition in an amount of usually from 0 to 95% by weight, preferably from 10 to 80% by weight, and more preferably from 20 to 50% by weight, based on the total weight of the ink composition.

When this water-soluble organic solvent is used, the content of the water may be determined within a vast range, depending on the type of component of the water-soluble organic solvent, the composition thereof and the desired properties of ink, and may be within the range of usually from 10 to 95% by weight, preferably from 10 to 75% by weight, and more preferably from 20 to 70% by weight, based on the total weight of the ink composition.

The process for preparing the water-based ink composition of the present invention, containing the fatty acids or fatty acid esters controlled to be in the content not more than the stated, will be described below.

First, the materials for the ink composition are mixed by a commonly available method, followed by precision filtration to obtain a filtrate. The filtrate obtained is left to stand for a day after its temperature has been raised to above normal temperature, preferably 40° C. or above. Thereafter, the filtrate is further left to stand for a day after its temperature has been lowered preferably to normal temperature or below, and more preferably 10° C. or below. The filtrate having been subjected to such aging is again precision-filtered in a temperature environment of normal temperature or below, and preferably 10° C. or below. Thus, the water-based ink composition of the present invention is obtained.

In the above preparation process, the temperature of the ink composition is raised to above normal temperature in order to accelerate the reaction of the fatty acids or fatty acid esters contained in the filtrate, with the cations typified by alkali metals to convert the former into insoluble fatty acid salts. The temperature of the filtrate thus treated is lowered to normal temperature or below in order to accelerate the precipitation of the insoluble fatty acid salts. The precision filtration thereafter carried out at a temperature of normal temperature or below is in order to remove the insoluble fatty acid salts without allowing the precipitated insoluble fatty acid salts to again dissolve in the ink composition.

In the ink composition thus obtained, the quantity of fatty acid or fatty acid esters can be greatly smaller than that before the treatment and also the quantity of metal cations such as alkali metals contained in the ink composition can be greatly smaller, so that an ideal state of ink as the ink composition for ink-jet recording can be achieved, having very less impurities.

In the foregoing, a method for controlling the content of the fatty acids or fatty acid esters in the ink composition is shown. Methods for such control are by no means limited to this method, and all methods by which the fatty acids or fatty acid esters or fatty acid salts can be removed can be effectively used.

In practice, together with the removal of such fatty acid or fatty acid ester matter, it is preferable to also remove various inorganic salts such as sodium chloride, sulfates and sodium salts, as well as calcium, magnesium and so forth.

The water-based ink composition used in the present invention is basically constituted as described above. Besides, various dispersants, surface active agents, viscosity modifiers, surface tension modifiers, pH adjusters, anticeptic antifungal agents known in the art may be optionally added.

When an ink composition is prepared which is used in an ink-jet recording process of the type a recording solution is charged, a specific resistance modifier including inorganic salts such as lithium chloride, ammonium chloride and sodium chloride is added.

When the ink composition is used in the ink-jet recording of the type the ink is ejected by the action of heat energy, thermal properties (e.g., specific heat, coefficient of thermal expansion, and thermal conductivity) are controlled in some cases.

The water-based ink composition used in the present invention, obtained in the manner as described above, has well solved the problems involved in the prior art, and is for itself advantageous as having well balanced performances in respect of all of recording performances in ink-jet recording (e.g., signal response, stability in droplet formation, long-time continuous recording performance, and ink ejection stability after long-time pause), storage stability, fixing performance to recording mediums, recorded image light-fastness, water resistance and so forth. It can be useful as water-based ink compositions for ink-jet recording of various systems, can be preferable as a water-based ink composition especially for the ink-jet recording system in which the water-based ink composition is jetted in the form of droplets by utilizing the vibration of a piezoelectric device and for the ink-jet recording system in which the water-based ink composition is jetted in the form of droplets by utilizing the action of heat energy, the latter being the ink-jet recording system easily affected by the formation of deposits. The present water-based ink composition can also enjoy superior recording.

EXAMPLES

Examples in which the present invention is embodied will be given below.

In the following description, "%" and "parts" are by weight.

Example A1

Composition of liquid:

| | |
|---|---|
| Acid Yellow 23 (Acid Yellow XX-SF; trade name; available from Hoechst Japan, Ltd.) | 1% |
| Diethylene glycol | 10% |
| Glycerol | 2% |
| Pure water | 87% |

The above materials were thoroughly mixed and stirred, followed by filtration with a 0.8 μm membrane filter to obtain a filtrate. This filtrate was heated to 40° C. and left to stand overnight (heat aging). Thereafter, the resulting filtrate was cooled to 5° C. and left to stand overnight (cold aging). After such aging, while being maintained at 5° C., the filtrate was further again filtered with the 0.8 μm membrane filter to form an ink composition.

Fatty acid content in this ink composition was measured using a gas chromatography mass spectrometer to reveal that it was 0.08%. Of the fatty acids, palmitic acid was in a content of 0.02%, and stearic acid, 0.05%. Fatty acids such as behenic acid and myristic acid other than palmitic acid and stearic acid were in a content of 0.01% in total.

Using this ink composition, the following T1 to T5 were examined on a recording apparatus having an on-demand type multi-head that performs recording by imparting heat energy to the ink in the recording head to produce ink droplets (ejection orifice diameter: 35 μm; heating resistor resistance value: 150 ohms; drive voltage: 30 volts; frequency: 2 KHz) and a recording apparatus having an on-demand type multi-head that performs recording by imparting pressure produced by piezoelectric vibration, to the ink in the recording head to produce ink droplets (ejection orifice diameter: 40 μm; drive voltage: 30 volts; frequency: 10 KHz), to find that good results were obtained in all the cases as noted below together.

(T1) Long-term stability: The ink composition was hermetically enclosed in a bag made of plastic film, and stored at −30° C. or 60° C. for 6 months. Even after such storage, deposition of insoluble matter was not seen, and any changes in liquid properties and color tones were also not seen.

(T2) Ejection stability: The ink composition was continuously ejected in an atmosphere of room temperature, 5° C. or 40° C., for 24 hours for each. Always stable, high-quality recording was performed in all atmospheres.

(T3) Ejection response: Ejection intermittently carried out at intervals of 2 seconds and ejection after leaving for 2 months were examined. In both instances, no clogging occurred at the orifice tips, and stable and uniform recording was performed.

(T4) Quality of recorded images: Images recorded on the recording mediums shown below had a high density and were sharp. After the images were exposed to room light for 6 months, their densities decreased by 1% or less.

Recording mediums:

Woodfree paper GINKAN, trade name, available from Sanyo Pulp Co., Ltd.

Woodfree paper SEVEN STAR, trade name, available from Hokuetsu Paper Co., Ltd.

Mechanical woodpulp paper HAKUBOTAN, trade name, available from Honshu Paper Co., Ltd.

Non-size paper TOYO ROSHI No. 4, trade name, available from Toyo Roshi Co., Ltd.

(T5) Fixing performance on each kind of recording medium: Five seconds after printing on the recording medium shown in the above (T4), print areas were rubbed with fingers to examine whether or not images were rubbed off or blurred. As the result, images were neither rubbed off nor blurred in all instances, showing a superior fixing performance.

Examples A2 to A4

Ink compositions were prepared in the same manner as in Example A1 except that the following commercially available dyes were used, and T1 to T5 of the respective ink compositions were examined in the same manner as in Example A1. Like those in Example A1, these ink compositions showed good results.

Example A2:

| | |
|---|---|
| Acid Blue 9 (Acid Blue AE-SF; trade name; available from Hoechst Japan, Ltd.) | 2% |
| Diethylene glycol | 12% |
| Pure water | 86% |

Fatty acid content in the ink composition, controlled to 0.06%; palmitic acid, 0.01%, and stearic acid, 0.03%.

Example A3:

| | |
|---|---|
| Acid Red 52 (Acid Rhodamine B-SF; trade name; available from Hoechst Japan, Ltd.) | 1% |
| Diethylene glycol | 10% |
| Triethanolamine | 3% |
| Pure water | 86% |

Fatty acid content in the ink composition, controlled to 0.04%; palmitic acid, 0.01%, and stearic acid, 0.02%.

Example A4:

| | |
|---|---|
| Direct Black 168 (Direct Black HEF-SF; trade name; available from Hoechst Japan, Ltd.) | 3% |
| Glycerol | 10% |
| Ethanol | 5% |
| Pure water | 82% |

Fatty acid content in the ink composition, controlled to 0.09%; palmitic acid, 0.03%, and stearic acid, 0.05%.

Example A5

Using respectively the ink composition of Example A1 as cyan ink, the ink composition of Example A2 as magenta ink, the ink composition of Example A3 as yellow ink and the ink composition of Example A4 as black ink, full-color photographic images were reproduced on the same ink-jet recording apparatus as used in Examples A1 to A4. Images obtained were very sharp and their colors were well reproduced.

Examples A6 to A9

Using the same commercially available dyes as used in Examples A1 to A4, ink compositions were prepared in the same manner as in Example A1 except that in the preparation of the ink compositions the high-temperature aging was carried out at a temperature of 35° C., and the low-temperature aging and the re-filtration, at 10° C. (Examples A6 to A9). T1 to T5 of the respective ink compositions thus prepared were examined in the same manner as in Example A1. As the result, like those in Example A1, these ink compositions showed good results in respect of T1, T2, T4 and T5. In respect of T3, curved Jets and changes in flying speed were slightly observed at the ejection after leaving for 2 months, but the original state was restored immediately after the printing was started.

Example A6:

The same composition of liquid as Example A1.

Fatty acid content in the ink composition, controlled to 0.25%; palmitic acid, 0.08%, and stearic acid, 0.15%.

Example A7:

The same composition of liquid as Example A2.

Fatty acid content in the ink composition, controlled to 0.20%; palmitic acid, 0.06%, and stearic acid, 0.12%.

Example A8:

The same composition of liquid as Example A3.

Fatty acid content in the ink composition, controlled to 0.17%; palmitic acid, 0.05%, and stearic acid, 0.11%.

Example A9:

The same composition of liquid as Example A4.

Fatty acid content in the ink composition, controlled to 0.29%; palmitic acid, 0.09%, and stearic acid, 0.18%.

Example A10

Pigment carbon black and a 100-fold amount of pure water were stirred for 1 hour, and the mixture was filtered three times, followed by drying. Using this product, a liquid composition having the composition shown below was prepared, and was subjected to dispersion by means of a dispersion machine PEARL MILL (trade name, manufactured by Ashizawa K. K.) to obtain a dispersion.

As grinding media put in the dispersion machine, zirconia beads were used. At the parts coming in contact with liquid in the dispersion machine, those subjected to ceramic coating were used.

Liquid composition:

| | |
|---|---|
| Carbon black (MA-7, available from Mitsubishi Chemical Industries Limited) | 10% |
| Styrene-maleic anhydride copolymer (molecular weight: 10,000; acid value: 175) | 7% |
| Glycerol | 5% |
| NIKKOL TS-30 (trade name; available from Nikko Chemicals Co., Ltd.) | 2% |
| Pure water | 75% |
| Triethanolamine | 1% |

Next, this dispersion was treated by a centrifugal separator to remove coarse particles, and then the resulting dispersion was pressure filtered with a membrane filter of 1 μm in average pore diameter. Thereafter the filtrate formed was heated to 40° C. and left to stand for a day. Then, the resulting filtrate was cooled to 5° C., left to stand for a day and again filtered with a membrane filter of 1 μm in an environment of 5° C. to obtain an ink composition. Fatty acid content in the ink composition thus prepared was measured in the same manner as in Example A1 to reveal that it was 0.06%. Of the fatty acids, palmitic acid was in a content of 0.01%, and stearic acid, 0.03%. T1 to T5 of this ink composition were examined in the same manner as in Example A1. Like those in Example A1, the ink composition showed good results.

Comparative Examples A1 to A4

Using the same commercially available dyes as used in Examples A1 to A4, ink compositions were prepared in the same manner as in Example A1 except that the heat aging, cool aging and re-filtration were not carried out (Comparative Examples A1 to A4). T1 to T5 of the respective ink compositions thus prepared were examined in the same manner as in Example A1. As the result, deposition of insoluble matter was seen in respect of T1. In respect of T2 and T3, clogging, curved jets and changes in flying speed were frequently observed, and the original state was not restorable.

Comparative Example A1:

The same composition of liquid as Example A1.

Fatty acid content in the ink composition, 1.10%; palmitic acid, 0.35%, and stearic acid, 0.61%.

Comparative Example A2:

The same composition of liquid as Example A2.

Fatty acid content in the ink composition, 0.95%; palmitic acid, 0.31%, and stearic acid, 0.57%.

Comparative Example A3:

The same composition of liquid as Example A3.

Fatty acid content in the ink composition, 0.90%; palmitic acid, 0.25%, and stearic acid, 0.54%.

Comparative Example A4:

The same composition of liquid as Example A4.

Fatty acid content in the ink composition, 1.45%; palmitic acid, 0.46%, and stearic acid, 0.92%.

As is clear from the foregoing description, in the case of the ink compositions of Example A1 to A10 and the ink-jet recording carried out using them, fatty acids contained in the ink compositions are in a content not more than 0.3% by weight, and preferably not more than 0.09% by weight, as so characterized in the present invention. Hence, good printing can be enjoyed without causing the clogging of nozzles or orifices and the faulty prints due to curved jets, changes in ink drop quantity and changes in flying speed, when the ink composition are used, when stored for a long term and even when undergo changes in temperature and environment. Also, when the ink compositions of the present invention are used in the ink-jet recording system utilizing heat energy, the deposits on the surface of the heating element may be hardly formed, bringing about the advantage that the durability of the head can be improved.

Example B1

Composition of liquid:

| Acid Yellow 23 (Acid Yellow XX-SF; trade name; available from Hoechst Japan, Ltd.) | 1% |
| Diethylene glycol | 10% |
| Glycerol | 2% |
| Pure water | 87% |

The above materials were thoroughly mixed and stirred, followed by filtration with a 0.8 μm membrane filter to obtain a filtrate. This filtrate was heated to 40° C. and left to stand overnight (heat aging). Thereafter, the resulting filtrate was cooled to 5° C. and left to stand overnight (cold aging). After such aging, while being maintained at 5° C., the filtrate was further again filtered with the 0.8 μm membrane filter to form an ink composition.

Fatty acid ester content in this ink composition was measured using a gas chromatography mass spectrometer to reveal that it was 0.17%. Of the fatty acid esters, methyl palmitate was in a content of 0.05%, and methyl stearate, 0.10%. Fatty acid esters such as methyl behenate and methyl myristate other than methyl palmitate and methyl stearate were in a content of 0.02% in total.

Using this ink composition, like Example B1, the following T1 to T5 were examined on a recording apparatus having an on-demand type multi-head that performs recording by imparting heat energy to the ink in the recording head to produce ink droplets (ejection orifice diameter: 35 μm; heating resistor resistance value: 150 ohms; drive voltage: 30 volts; frequency: 2 KHz) and a recording apparatus having an on-demand type multi-head that performs recording by imparting pressure produced by piezoelectric vibration, to the ink in the recording head to produce ink droplets (ejection orifice diameter: 40 μm; drive voltage: 30 volts; frequency: 10 KHz), to find that good results were obtained in all the cases as noted below together.

(T1) Long-term stability: The ink composition was hermetically enclosed in a bag made of plastic film, and stored at −30° C. or 60° C. for 6 months. Even after such storage, deposition of insoluble matter was not seen, and any changes in liquid properties and color tones were also not seen.

(T2) Ejection stability: The ink composition was continuously ejected in an atmosphere of room temperature, 5° C. or 40° C., for 24 hours for each. Always stable, high-quality recording was performed in all atmospheres.

(T3) Ejection response: Ejection intermittently carried out at intervals of 2 seconds and ejection after leaving for 2 months were examined. In both instances, no clogging occurred at the orifice tips, and stable and uniform recording was performed.

(T4) Quality of recorded images: Images recorded on the recording mediums shown below had a high density and were sharp. After the images were exposed to room light for 6 months, their densities decreased by 1% or less.

Recording mediums:

Woodfree paper GINKAN, trade name, available from Sanyo Pulp Co., Ltd.

Woodfree paper SEVEN STAR, trade name, available from Hokuetsu Paper Co., Ltd.

Mechanical woodpulp paper HAKUBOTAN, trade name, available from Honshu Paper Co., Ltd.

Non-size paper TOYO ROSHI No. 4, trade name, available from Toyo Roshi Co., Ltd.

(T5) Fixing performance on each kind of recording medium: Five seconds after printing on the recording medium shown in the above (T4), print areas were rubbed with fingers to examine whether or not images were rubbed off or blurred. As the result, images were neither rubbed off nor blurred in all instances, showing a superior fixing performance.

Examples B2 to B4

Ink compositions were prepared in the same manner as in Example B1 except that the following commercially available dyes were used, and T1 to T5 of the respective ink compositions were examined in the same manner as in Example B1. Like those in Example B1, these ink compositions showed good results.

Example B2:

| Acid Blue 9 (Acid Blue AE-SF; trade name; available from Hoechst Japan, Ltd.) | 2% |
| Diethylene glycol | 12% |
| Pure water | 86% |

Fatty acid ester content in the ink composition, controlled to 0.16%; methyl palmitate, 0.04%, and methyl stearate, 0.09%.

Example B3:

| | |
|---|---|
| Acid Red 52 (Acid Rhodamine B-SF; trade name; available from Hoechst Japan, Ltd.) | 1% |
| Diethylene glycol | 10% |
| Triethanolamine | 3% |
| Pure water | 86% |

Fatty acid ester content in the ink composition, controlled to 0.17%; methyl palmitate, 0.05%, and methyl stearate, 0.11%.

Example B4:

| | |
|---|---|
| Direct Black 168 (Direct Black HEF-SF; trade name; available from Hoechst Japan, Ltd.) | 3% |
| Glycerol | 10% |
| Ethanol | 5% |
| Pure water | 82% |

Fatty acid ester content in the ink composition, controlled to 0.25%; methyl palmitate, 0.08%, and methyl stearate, 0.15%.

Example B5

Using respectively the ink composition of Example B1 as cyan ink, the ink composition of Example B2 as magenta ink, the ink composition of Example B3 as yellow ink and the ink composition of Example B4 as black ink, full-color photographic images were reproduced on the same ink-jet recording apparatus as used in Examples B1 to B4. Images obtained were very sharp and their colors were well reproduced.

Examples B6 to B9

Using the same commercially available dyes as used in Examples B1 to B4, ink compositions were prepared in the same manner as in Example B1 except that in the preparation of the ink compositions the high-temperature aging was carried out at a temperature of 35° C., and the low-temperature aging and the re-filtration, at 10° C. (Examples B6 to B9). T1 to T5 of the respective ink compositions thus prepared were examined in the same manner as in Example B1. As the result, like those in Example B1, these ink compositions showed good results in respect of T1, T2, T4 and T5. In respect of T3, curved jets and changes in flying speed were slightly observed at the ejection after leaving for 2 months, but the original state was restored immediately after the printing was started.

Example B6:

The same composition of liquid as Example B1.

Fatty acid ester content in the ink composition, controlled to 0.50%; methyl palmitate, 0.14%, and methyl stearate, 0.29%.

Example B7:

The same composition of liquid as Example B2.

Fatty acid ester content in the ink composition, controlled to 0.44%; methyl palmitate, 0.12%, and methyl stearate, 0.28%.

Example B8:

The same composition of liquid as Example B3.

Fatty acid ester content in the ink composition, controlled to 0.45%; methyl palmitate, 0.14%, and methyl stearate, 0.26%.

Example B9:

The same composition of liquid as Example B4.

Fatty acid ester content in the ink composition, controlled to 0.58%; methyl palmitate, 0.19%, and methyl stearate, 0.35%.

Example B10

Pigment carbon black and a 100-fold amount of pure water were stirred for 1 hour, and the mixture was filtered three times, followed by drying. Using this product, a liquid composition having the composition shown below was prepared, and was subjected to dispersion by means of a dispersion machine PEARL MILL (trade name, manufactured by Ashizawa K. K.) to obtain a dispersion.

As grinding media put in the dispersion machine, zirconia beads were used. At the parts coming in contact with liquid in the dispersion machine, those subjected to ceramic coating were used.

Liquid composition:

| | |
|---|---|
| Carbon black (MA-7, available from Mitsubishi Chemical Industries Limited) | 10% |
| Styrene-maleic anhydride copolymer (molecular weight: 10,000; acid value: 175) | 7% |
| Glycerol | 5% |
| NIKKOL TS-30 (trade name; available from Nikko Chemicals Co., Ltd.) | 2% |
| Pure water | 75% |
| Triethanolamine | 1% |

Next, this dispersion was treated by a centrifugal separator to remove coarse particles, and then the resulting dispersion was pressure filtered with a membrane filter of 1 μm in average pore diameter. Thereafter the filtrate formed was heated to 40° C. and left to stand for a day. Then, the resulting filtrate was cooled to 5° C., left to stand for a day and again filtered with a membrane filter of 1 μm in an environment of 5° C. to obtain an ink composition. Fatty acid ester content in the ink composition thus prepared was measured in the same manner as in Example B1 to reveal that it was 0.20%. Of the fatty acid esters, methyl palmitate was in a content of 0.06%, and methyl stearate, 0.11%. T1 to T5 of this ink composition were examined in the same manner as in Example B1. Like those in Example B1, the ink composition showed good results.

Comparative Examples B1 to B4

Using the same commercially available dyes as used in Examples B1 to B4, ink compositions were prepared in the same manner as in Example B1 except that the heat aging, cool aging and re-filtration were not carried out (Comparative Examples B1 to B4). T1 to T5 of the respective ink compositions thus prepared were examined in the same manner as in Example B1. As the result, deposition of insoluble matter was seen in respect of T1. In respect of T2 and T3, clogging, curved Jets and changes in flying speed were frequently observed, and the original state was not restorable.

Comparative Example B1:

The same composition of liquid as Example B1.

Fatty acid ester content in the ink composition, 1.62%; methyl palmitate, 0.55%, and methyl stearate, 0.94%.

Comparative Example B2:

The same composition of liquid as Example B2.

Fatty acid ester content in the ink composition, 1.40%; methyl palmitate, 0.49%, and methyl stearate, 0.88%.

Comparative Example B3:

The same composition of liquid as Example B3.

Fatty acid ester content in the ink composition, 1.35; methyl palmitate, 0.44%, and methyl stearate, 0.79%.

Comparative Example B4:

The same composition of liquid as Example B4.

Fatty acid ester content in the ink composition, 1.94%; methyl palmitate, 0.65%, and methyl stearate, 1.14%.

As is clear from the foregoing description, in the case of the ink compositions of Example B1 to B10 and the ink-jet recording carried out using them, fatty acid esters contained in the ink compositions are in a content not more than 0.6% by weight, and preferably not more than 0.3% by weight, as so characterized in the present invention. Hence, good printing can be enjoyed without causing the clogging of nozzles or orifices and the faulty prints due to curved jets, changes in ink drop quantity and changes in flying speed, when the ink composition are used, when stored for a long term and even when undergo changes in temperature and environment. Also, when the ink compositions of the present invention are used in the ink-jet recording system utilizing heat energy, the deposits on the surface of the heating element may be hardly formed, bringing about the advantage that the durability of the head can be improved.

What is claimed is:

1. A water-based ink composition comprising a dye or a pigment, dissolved or dispersed in an aqueous medium, wherein said water-based ink composition has at least one of i) fatty acids in a total content not more than 0.3% by weight and ii) fatty acid esters comprising methyl palmitate and methyl stearate in a total content not more than 0.6% by weight.

2. The water-based ink composition according to claim 1, wherein said water-based ink composition has fatty acids in a total content not more than 0.3% by weight and fatty acid esters in a total content not more than 0.6% by weight.

3. The water-based ink composition according to claim 2, wherein said fatty acids are in a total content not more than 0.09% by weight and said fatty acid esters are in a total content not more than 0.3% by weight.

4. The water-based ink composition according to claim 1, wherein said fatty acids comprise palmitic acid and stearic acid.

5. The water-based ink composition according to claim 4, wherein said palmitic acid is in a content not more than 0.1% by weight and said stearic acid is in a content not more than 0.2% by weight.

6. The water-based ink composition according to claim 4, wherein said palmitic acid is in a content not more than 0.03% by weight and said stearic acid is in a content not more than 0.06% by weight.

7. The water-based ink composition according to claim 1, wherein said methyl palmitate is in a content not more than 0.2% by weight and said methyl stearate is in a content not more than 0.4% by weight.

8. The water-based ink composition according to claim 1, wherein said methyl palmitate is in a content not more than 0.1% by weight and said methyl stearate is in a content not more than 0.2% by weight.

9. The water-based ink composition according to claim 1, wherein said dye or pigment is contained in an amount of from 0.1% by weight to 20% by weight based on the total weight of the water-based ink composition.

10. The water-based ink composition according to claim 1, wherein said aqueous medium is a mixed solvent of water and a water-soluble organic solvent.

11. The water-based ink composition according to claim 11, wherein said water is deionized water.

12. An ink-jet recording processing comprising jetting a water-based ink composition to a recording medium in the form of droplets to make a record, wherein said water-based ink composition comprises a dye or a pigment, dissolved or dispersed in an aqueous medium, and has at least one of i) fatty acids in a total content not more than 0.3% by weight and ii) fatty acid esters comprising methyl palmirate and methyl stearate in a total content not more than 0.6 by weight.

13. The ink-jet recording process according to claim 12 wherein said water-based ink composition has fatty acids in a total content not more than 0.3% by weight and fatty acid esters in a total content not more than 0.6% by weight.

14. The ink-jet recording process according to claim 13, wherein said fatty acids are in a total content not more than 0.09% by weight and said fatty acid esters are in a total content not more than 0.3% by weight.

15. The ink-jet recording process according to claim 12, wherein said fatty acids comprise palmitic acid and stearic acid.

16. The ink-jet recording process according to claim 15, wherein said palmitic acid is in a content not more than 0.1% by weight and said stearic acid is in a content not more than 0.2% by weight.

17. The ink-jet recording process according to claim 15, wherein said palmitic acid is in a content not more than 0.03% by weight and said stearic acid is in a content not more than 0.06% by weight.

18. The ink-jet recording process according to claim 12, wherein said methyl palmitate is in a content not more than 0.2% by weight and said methyl stearate is in a content not more than 0.4% by weight.

19. The ink-jet recording process according to claim 12, wherein said methyl palmitate is in a content not more than 0.1% by weight and said methyl stearate is in a content not more than 0.2% by weight.

20. The ink-jet recording process according to claim 12, wherein said dye or pigment is contained in an amount of from 0.1% by weight to 20% by weight based on the total weight of the water-based ink composition.

21. The ink-jet recording process according to claim 12, wherein said aqueous medium is a mixed solvent of water and a water-soluble organic solvent.

22. The ink-jet recording process according to claim 21, wherein said water is deionized water.

23. The ink-jet recording process according to claim 12, wherein said water-based ink composition is jetted in the form of droplets by utilizing the vibration of a piezoelectric device.

24. The ink-jet recording process according to claim 12, wherein said water-based ink composition is jetted in the form of droplets by the action of heat energy.

25. The water-based ink composition according to claim 1, wherein the fatty acids are present in a total content of not more than 0.09% by weight or the fatty acid esters are present in a total content of not more than 0.3% by weight.

26. A water-based ink composition comprising a dye or a pigment, dissolved or dispersed in an aqueous medium, wherein said water-based ink composition has fatty acids in a total content of not more than 0.3% by weight.

27. The water-based ink composition according to claim 26, wherein the fatty acids are present in a total content of not more than 0.09% by weight.

28. The water-based ink composition according to claim 26, wherein the fatty acids comprise palmitic acid and stearic acid.

29. The water-based ink composition according to claim 28, wherein the palmitic acid is present in a content of not more than 0.1% by weight and the stearic acid is present in an amount of not more than 0.2% by weight.

30. The water-based ink composition according to claim 28, wherein the palmitic acid is present in an amount of not more than 0.03% by weight and the stearic acid is present in an amount of not more 0.06% by weight.

31. An ink-jet recording process according to claim 12, wherein the fatty acids are present in a total content of not more than 0.09% by weight or the fatty acid esters are present in a total content of not more 0.3% by weight.

* * * * *